United States Patent
Tomita

(10) Patent No.: US 9,558,593 B2
(45) Date of Patent: Jan. 31, 2017

(54) TERMINAL APPARATUS, ADDITIONAL INFORMATION MANAGING APPARATUS, ADDITIONAL INFORMATION MANAGING METHOD, AND PROGRAM

(71) Applicant: Sony Computer Entertainment Inc., Tokyo (JP)

(72) Inventor: Hisashi Tomita, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 195 days.

(21) Appl. No.: 14/514,558

(22) Filed: Oct. 15, 2014

(65) Prior Publication Data

US 2015/0124106 A1 May 7, 2015

(30) Foreign Application Priority Data

Nov. 5, 2013 (JP) ................................ 2013-229699

(51) Int. Cl.
| | | |
|---|---|---|
| *G06T 19/00* | (2011.01) | |
| *G06F 17/30* | (2006.01) | |
| *G06T 11/00* | (2006.01) | |
| *G06K 9/00* | (2006.01) | |

(52) U.S. Cl.
CPC ............. *G06T 19/006* (2013.01); *G06F 17/30* (2013.01); *G06F 17/30265* (2013.01); *G06K 9/00671* (2013.01); *G06T 11/00* (2013.01)

(58) Field of Classification Search
CPC ... G06T 19/006; G06T 11/00; G06K 9/00671; G06F 17/30
See application file for complete search history.

(56) References Cited

U.S. PATENT DOCUMENTS

| | | | | |
|---|---|---|---|---|
| 8,301,202 B2* | 10/2012 | Lee | ................... | H04M 1/72563 455/457 |
| 8,392,450 B2* | 3/2013 | Blanchflower | .... | H04N 21/4524 382/100 |
| 8,847,987 B2* | 9/2014 | Yu | ......................... | G06T 19/006 345/633 |
| 8,863,004 B2* | 10/2014 | Berus | ................ | G06F 17/30873 715/741 |
| 9,349,350 B2* | 5/2016 | Kim | ....................... | G09G 5/377 |
| 2006/0227992 A1* | 10/2006 | Rathus | .............. | G06F 17/30247 382/100 |
| 2008/0147730 A1* | 6/2008 | Lee | .................... | G06Q 30/0212 |
| 2008/0268876 A1* | 10/2008 | Gelfand | ................ | G06Q 30/02 455/457 |
| 2009/0061901 A1* | 3/2009 | Arrasvuori | ............ | G06Q 30/00 455/456.3 |

(Continued)

*Primary Examiner* — Aung S Moe

(74) *Attorney, Agent, or Firm* — Matthew B. Dernier, Esq.

(57) ABSTRACT

There is provided a terminal apparatus including: a photographing portion configured to photograph a subject which is present in a reality space; an additional information acquiring portion configured to acquire additional information which is made to correspond to an object an image of which is recognized within a photographed image; and an additional information storing portion configured to store therein the acquired additional information in relation to either user identification information or photographing apparatus identification information.

17 Claims, 13 Drawing Sheets

(56) References Cited

U.S. PATENT DOCUMENTS

| | | | |
|---|---|---|---|
| 2009/0102859 A1* | 4/2009 | Athsani | G06F 3/011 345/619 |
| 2009/0232354 A1* | 9/2009 | Camp, Jr. | G06Q 30/02 382/103 |
| 2010/0260426 A1* | 10/2010 | Huang | G06F 17/30247 382/218 |
| 2011/0161875 A1* | 6/2011 | Kankainen | G06F 3/0481 715/810 |
| 2011/0199479 A1* | 8/2011 | Waldman | G01C 21/3602 348/116 |
| 2011/0209201 A1* | 8/2011 | Chollat | G06F 17/30241 726/4 |
| 2012/0062595 A1* | 3/2012 | Oh | G06K 9/00671 345/633 |
| 2012/0096403 A1* | 4/2012 | Jung | G06F 3/0486 715/817 |
| 2012/0122491 A1* | 5/2012 | Kim | H04L 67/22 455/456.3 |
| 2012/0200743 A1* | 8/2012 | Blanchflower | H04N 21/254 348/239 |
| 2012/0310717 A1* | 12/2012 | Kankainen | G06Q 30/02 705/14.4 |
| 2013/0033522 A1* | 2/2013 | Calman | G06Q 30/0633 345/633 |
| 2013/0147837 A1* | 6/2013 | Stroila | G06T 19/006 345/633 |
| 2013/0155107 A1* | 6/2013 | Ashour | G06T 19/006 345/633 |
| 2013/0257900 A1* | 10/2013 | Brahmakal | G06Q 30/0241 345/619 |
| 2013/0293580 A1* | 11/2013 | Spivack | G06Q 30/0643 345/633 |
| 2013/0297407 A1* | 11/2013 | Hymel | G06Q 30/0267 705/14.43 |
| 2014/0025481 A1* | 1/2014 | Kang | G06Q 30/0241 705/14.43 |
| 2014/0079281 A1* | 3/2014 | Williams | G06K 9/62 382/103 |
| 2014/0146082 A1* | 5/2014 | So | G06K 9/00671 345/633 |
| 2014/0185871 A1* | 7/2014 | Ito | G06K 9/00671 382/103 |
| 2014/0253743 A1* | 9/2014 | Loxam | H04N 5/232 348/207.1 |
| 2014/0304321 A1* | 10/2014 | Stroila | H04L 67/38 709/203 |
| 2015/0032838 A1* | 1/2015 | Demsey | H04L 67/2842 709/213 |
| 2015/0058229 A1* | 2/2015 | Wiacek | G06F 21/10 705/310 |
| 2015/0317836 A1* | 11/2015 | Beaurepaire | G09G 5/14 345/634 |
| 2016/0163000 A1* | 6/2016 | Calman | G06Q 30/0633 705/26.8 |

\* cited by examiner

FIG. 3

| OBJECT ID | FEATURE INFORMATION | THUMBNAIL IMAGE | POSITION INFORMATION | DATE-AND-TIME INFORMATION | DIRECTION INFORMATION |
|---|---|---|---|---|---|

| ADDITIONAL INFORMATION ID | IMAGE | TEXT | SOUND |
|---|---|---|---|

| OBJECT ID | ADDITIONAL INFORMATION ID |
|---|---|

| USER ID/APPARATUS ID | ADDITIONAL INFORMATION ID |
|---|---|

86

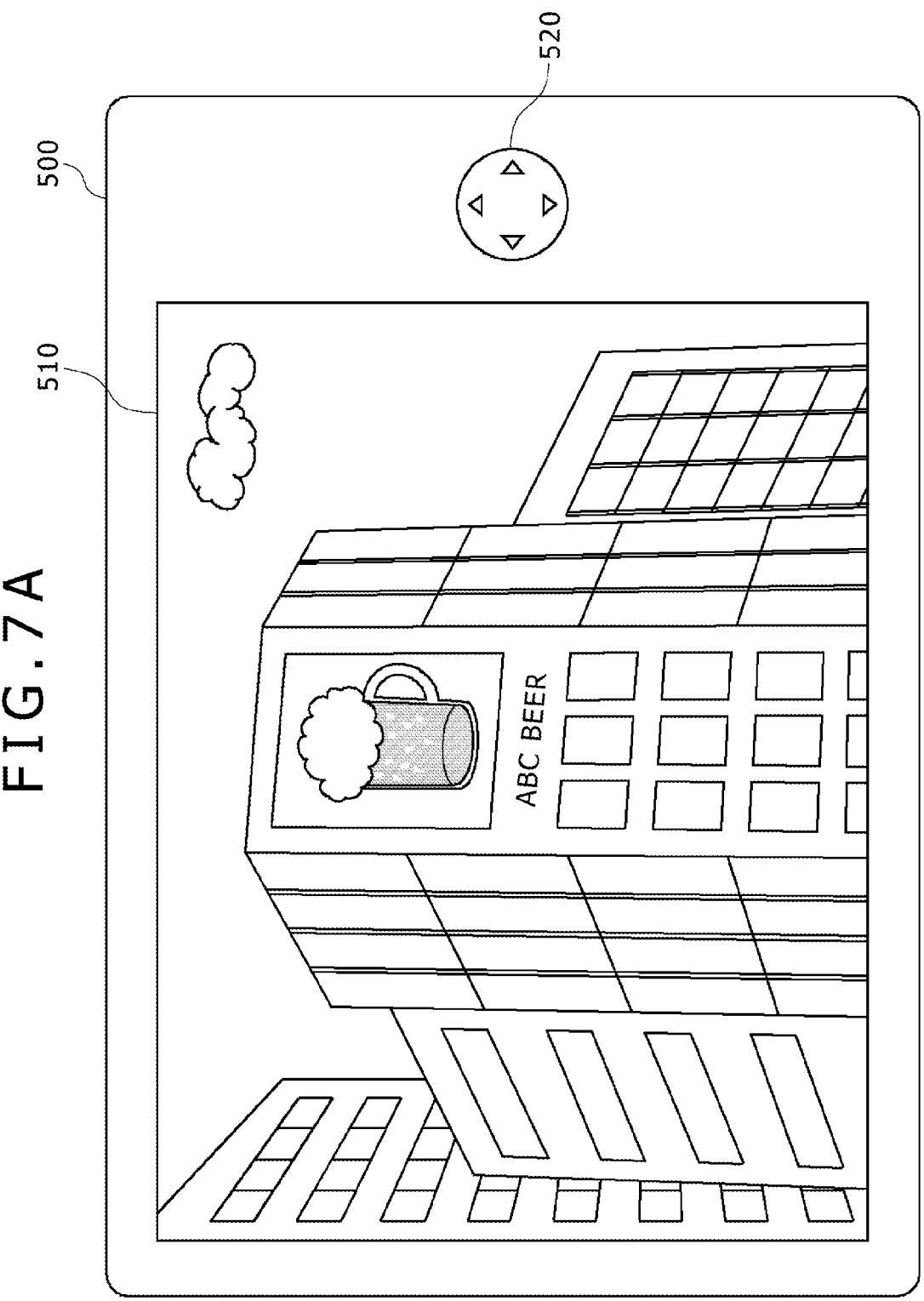

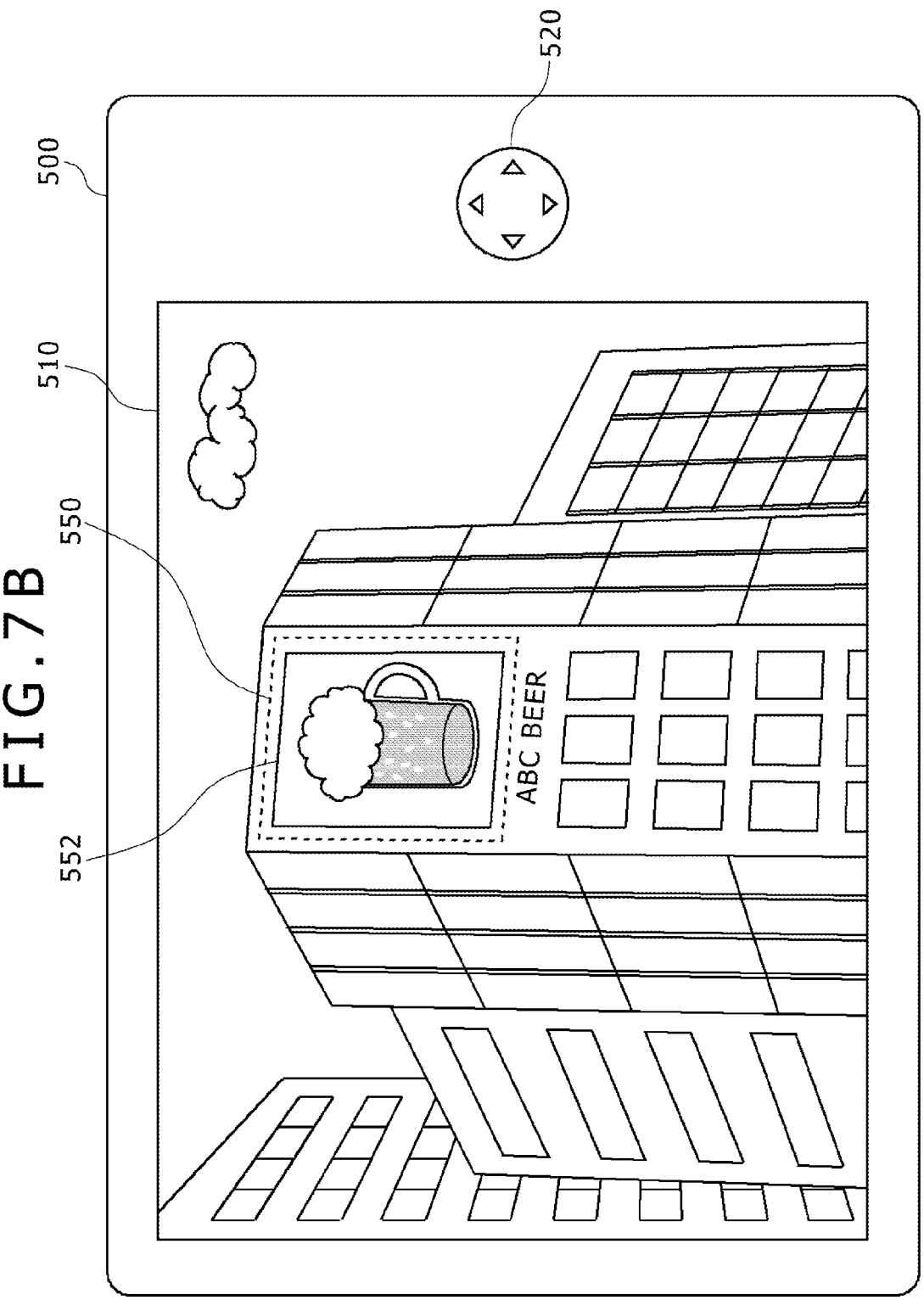

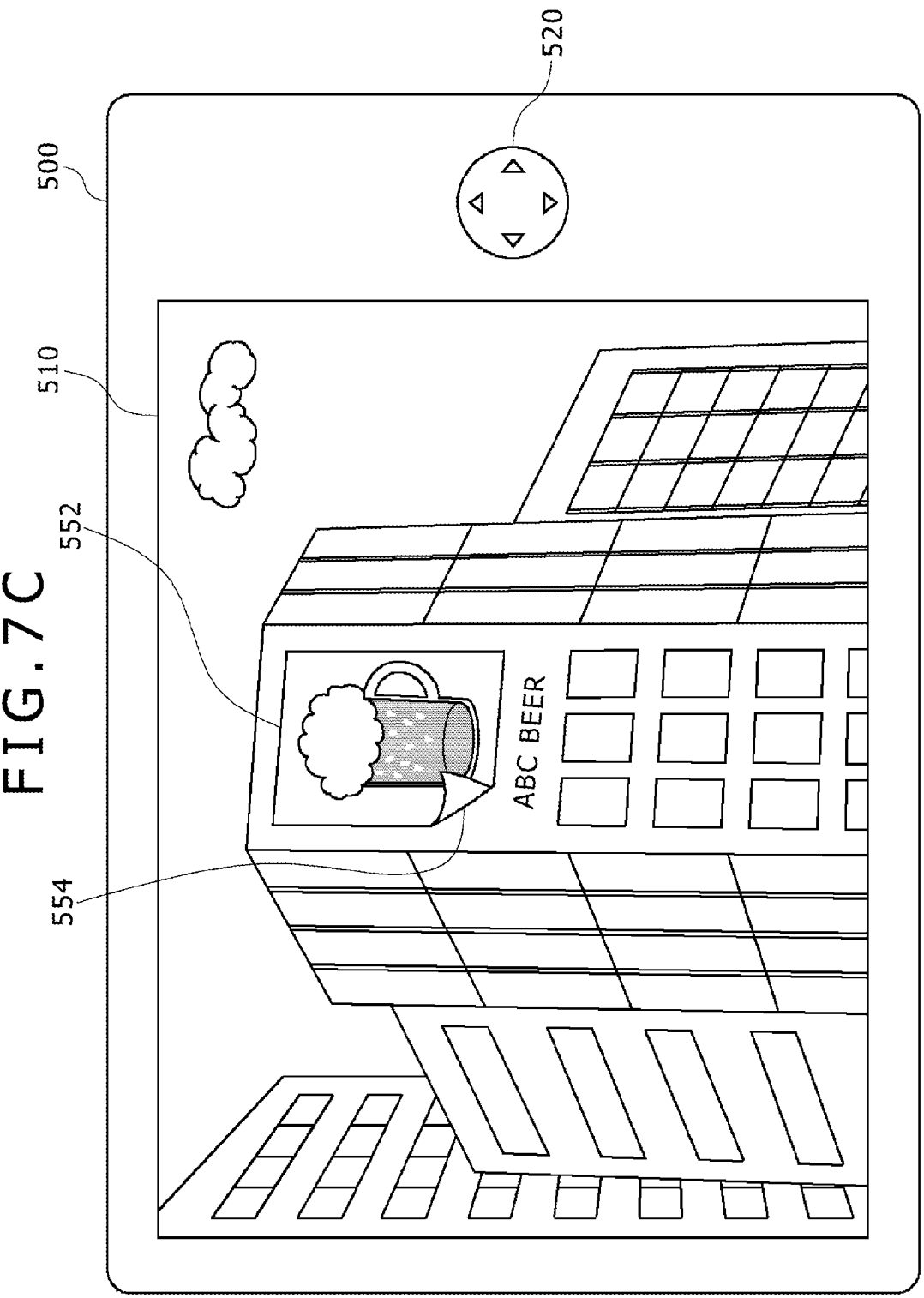

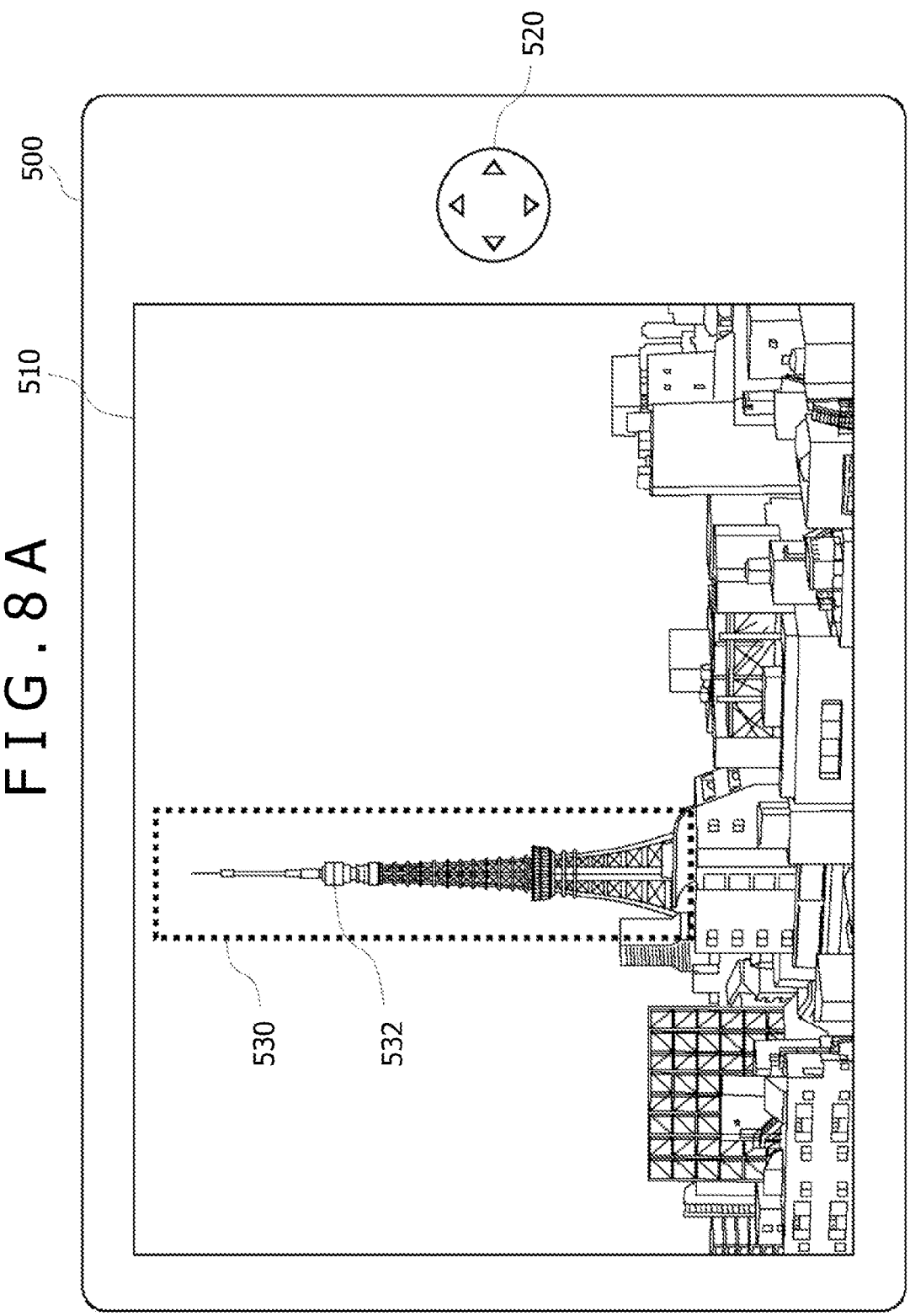

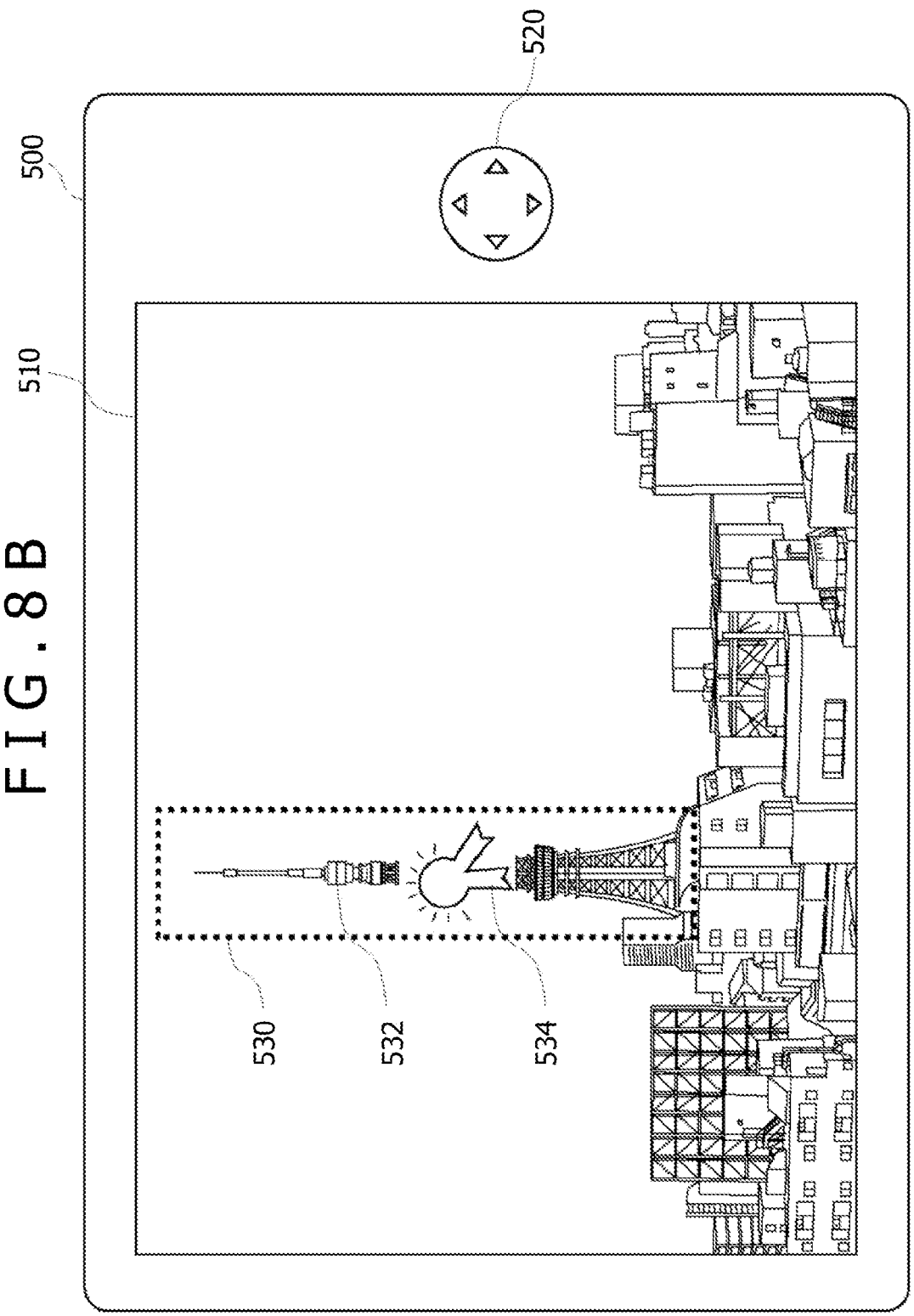

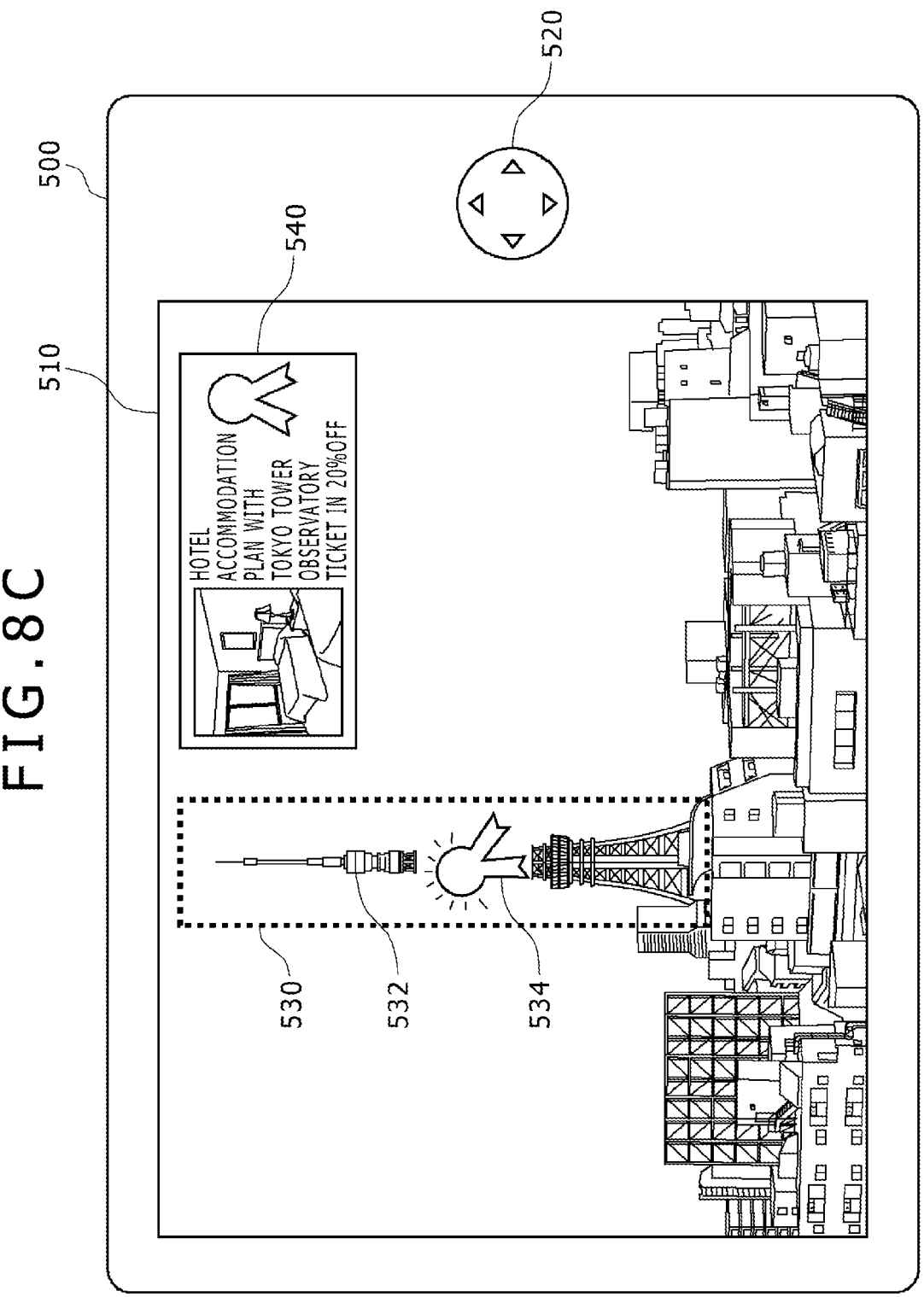

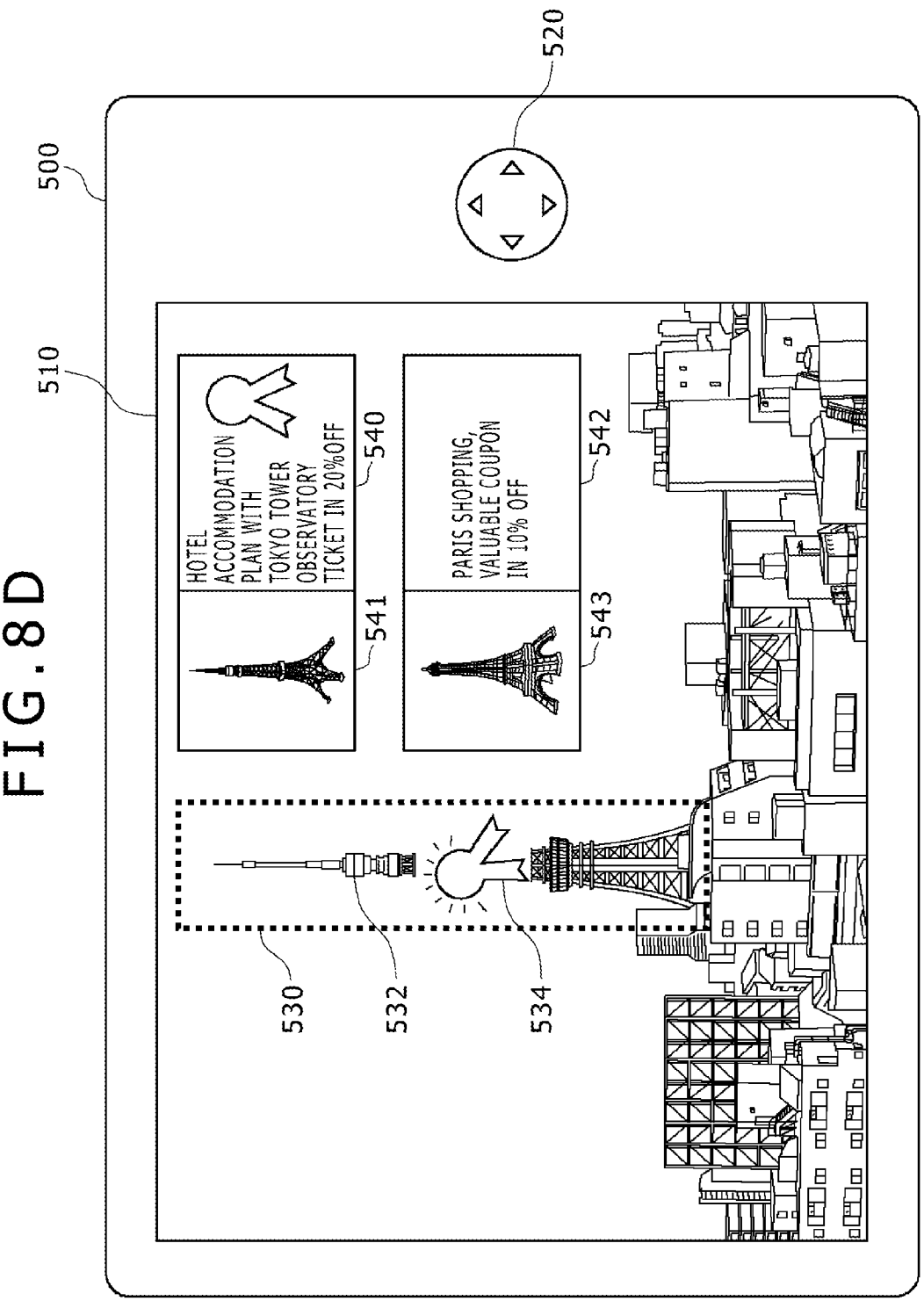

TERMINAL APPARATUS, ADDITIONAL INFORMATION MANAGING APPARATUS, ADDITIONAL INFORMATION MANAGING METHOD, AND PROGRAM

BACKGROUND

The present disclosure relates to a technique for providing additional information associated with a photographed object. More particularly, the present disclosure relates to a terminal apparatus, an additional information managing apparatus, an additional information managing method used in the same, and a program used in the same.

When a reality space is photographed with a camera built in a smartphone, a tablet terminal or the like, and the photographed image is displayed on a touch panel, an Augmented Reality (AR) technique is used with which additional information which is absent in the reality space is displayed with the additional information being superimposed on the photographed image to thereby provide sense of the augmented reality. The augmented reality offers an effect of augmenting a reality environment which a human being perceives by providing virtually the additional information to the real world. The display performance of a display panel of the mobile apparatus such as the smartphone or the tablet terminal has been improved. Thus, a virtual object is displayed for the photographed image by using the augmented reality to thereby cause a user to interact with the virtual object, so that a new user's way of taking pleasure is created.

SUMMARY

When a marker such as a two-dimensional bar code is read with a built-in camera of the mobile apparatus, related information on a virtual object or the like which is made to correspond to the marker is displayed as the augmented reality. However, a safety system with which when the user photographs the outside world in the reality community, the additional information is displayed as the augmented reality, and thus the additional information can be practically utilized has not been proposed up to this day.

The present disclosure has been made in order to solve the problem described above, and it is therefore desirable to provide a technique with which additional information associated with a photographed object can be effectively provided, and more particularly to provide a terminal apparatus, an additional information managing apparatus, an additional information managing method used in the same, and a program used in the same.

In order to attain the desire described above, according to an embodiment of the present disclosure, there is provided a terminal apparatus including: a photographing portion configured to photograph a subject which is present in a reality space; an additional information acquiring portion configured to acquire additional information which is made to correspond to an object an image of which is recognized within a photographed image; and an additional information storing portion configured to store therein the acquired additional information in relation to either user identification information or photographing apparatus identification information.

According to another embodiment of the present disclosure, there is provided an additional information managing apparatus including: a photographed image acquiring portion configured to acquire a photographed image obtained by photographing a subject which is present in a reality space; an image recognizing portion configured to recognize an image of an object within the photographed image based on feature information on the photographed image; an additional information acquiring portion configured to acquire additional information which is associated with the object thus image-recognized by referring to a table in which the object and the additional information are associated with each other; and a transmitting portion configured to transmit the additional information thus acquired to a terminal apparatus with which the photographed image has been photographed.

According to still another embodiment of the present disclosure, there is provided an additional information managing method including: acquiring a photographed image obtained by photographing a subject which is present in a reality space; recognizing an image of an object within the photographed image based on feature information on the photographed image; acquiring additional information which is associated with the object thus image-recognized by referring to a table in which the object and the additional information are associated with each other; and transmitting the additional information thus acquired to a terminal apparatus with which the photographed image has been photographed.

According to yet another embodiment of the present disclosure, there is provided a program for a computer, including: acquiring a photographed image obtained by photographing a subject which is present in a reality space; recognizing an image of an object within the photographed image based on feature information on the photographed image; acquiring additional information which is associated with the object thus image-recognized by referring to a table in which the object and the additional information are associated with each other; and transmitting the additional information thus acquired to a terminal apparatus with which the photographed image has been photographed.

It should be noted that what are obtained by translating arbitrary combinations of the above constituent elements and expressions of the present disclosure among a method, an apparatus, a system, a computer program, a data structure, a recording medium, and so forth are also effective as embodiments of the present disclosure.

As set forth hereinabove, according to the present disclosure, the additional information which is associated with the photographed object can be effectively provided.

BRIEF DESCRIPTION OF THE DRAWINGS

FIG. 3 is a diagram explaining a record of an object which is stored in an object database shown in FIG. 2;

FIG. 4A is a diagram explaining a record of additional information which is stored in an additional information database shown in FIG. 2;

FIG. 4B is a diagram explaining a record in which an object ID and an additional information ID are made to correspond to each other;

FIG. 5 is a diagram explaining a record in which a user ID/apparatus ID, and an additional information ID which are stored in a user database shown in FIG. 2 are made to correspond to each other;

FIG. 7A is a view explaining a photographed image displayed on a touch panel of a tablet terminal;

FIG. 7B is a view explaining an object specified within the photographed image;

FIG. 7C is a view explaining additional information superimposed on the object within the photographed image;

FIG. 8A is a view explaining an object specified within a photographed image;

FIG. 8B is a view explaining an icon representing that a coupon is provided for an object within the photographed image;

FIG. 8C is a view explaining a coupon which is displayed when the icon shown in FIG. 8B is selected; and FIG. 8D is a view explaining an example in which a plurality of coupons are displayed for the object within the photographed image.

DETAILED DESCRIPTION OF THE PREFERRED EMBODIMENTS

Figure 1:
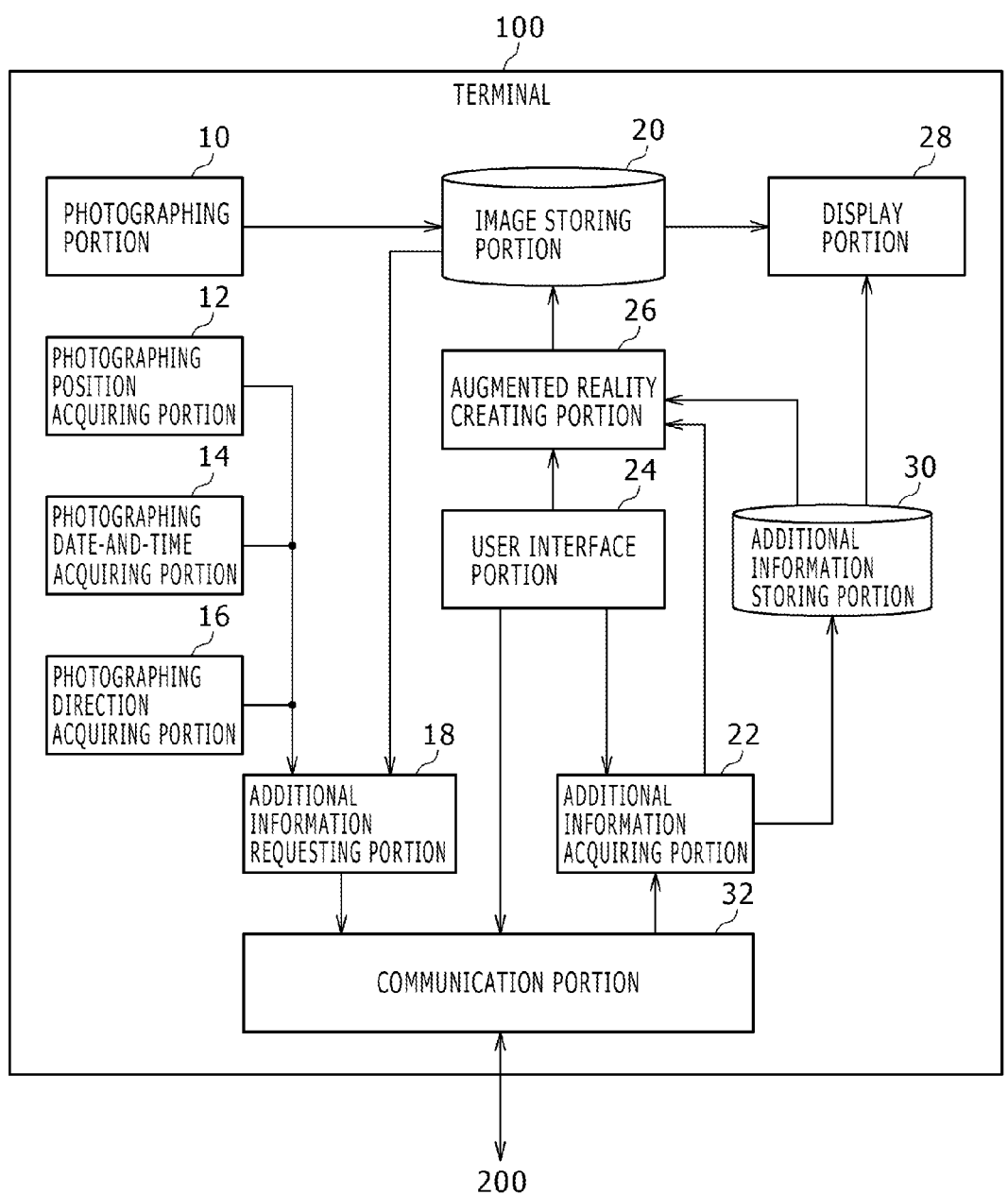
FIG. 1 is a block diagram showing a configuration of a terminal as a terminal apparatus according to a first embodiment of the present disclosure.

FIG. 1 is a block diagram showing a configuration of a terminal 100 as a terminal apparatus according to a first embodiment of the present disclosure. The terminal 100 is an electronic apparatus having a photographing function and a communication function. As an example, the terminal 100 includes a mobile phone, a smartphone, a tablet terminal or a camera.

A photographing portion 10, as an example, is a camera having a Charge Coupled Devices (CCD) image sensor, and photographs a subject which is present in a reality space to thereby store information on a photographed image in an image storing portion 20. A display portion 28 displays the photographed image the information on which is stored in the image storing portion 20 on a display device.

A photographing position acquiring portion 12, as an example, has a position sensor such as a Global Positioning System (GPS) receiver. The photographing position acquiring portion 12 acquires information on a photographing position and supplies the information thus acquired to an additional information requesting portion 18. A photographing date-and-time acquiring portion 14, as an example, is a built-in clock. The photographing date-and-time acquiring portion 14 acquires information on the date and time of the photographing and supplies the information thus acquired to the additional information requesting portion 18. The photographing date-and-time acquiring portion 14 may acquire the information on the date and time of the photographing from the GPS receiver.

A photographing direction acquiring portion 16, as an example, has any one of a terrestrial magnetism sensor, a gyro sensor, an acceleration sensor, and an angular acceleration sensor, or a combination thereof. The photographing direction acquiring portion 16 acquires information on a photographing direction of the camera built in the terminal 100 by detecting a direction or an inclination of the terminal 100, and supplies the information thus acquired to the additional information requesting portion 18.

The additional information requesting portion 18 transmits the information on the photographed image which is stored in the image storing portion 20 together with an additional information request instruction to a cloud server 200 through a communication portion 32.

In addition, the additional information requesting portion 18 may transmit at least one of the information on the photographing position, the information on the date and time of the photographing, and the information on the photographing direction together with the additional information request instruction to the cloud server 200 through the communication portion 32.

The communication portion 32, as an example, is connected to the network through the wireless communication, and transmits the data to the cloud server 200 and receives the data from the cloud server 200.

The cloud server 200 recognizes an image of a predetermined object from the photographed image. In order to more precisely specify the object, the cloud server 200 may use at least one of the information on the photographing position, the information on the date and time of the photographing, and the information on the photographing direction in combination with the photographed image. Alternatively, the cloud server 200 may specify an object which will be seen in a point-of-view position and a line-of-sight direction by combining the information on the photographing position with the information on the photographing direction without using the photographed image.

An example of the object includes a specific scene, building, signboard, and person. The information on the object is previously registered together with the feature information on the image of the object in a database.

The cloud server 200 acquires the additional information associated with the object the image of which is recognized, and transmits that additional information to the terminal 100.

An example of the additional information includes a coupon which can be exchanged with a predetermined item, a digital item such as a character or a weapon which can be utilized in a game, and electronic money.

An additional information acquiring portion 22 receives the additional information associated with the object the image of which is recognized within the photographed image from the cloud server 200 through the communication portion 32. The additional information acquiring portion 22 supplies the additional information which has been acquired from the cloud server 200 to an augmented reality creating portion 26.

The augmented reality creating portion 26 executes processing for superimposing the additional information as the augmented reality on the photographed image the information on which is stored in the image storing portion 20. The display portion 28 reads out the information on the photographed image on which the augmented reality is superimposed by the augmented reality creating portion 26 from the image storing portion 20, and displays the photographed image concerned on the display device of the display portion 28.

A user interface portion 24 receives a user manipulation for a manipulation button of the terminal 100, or a user manipulation carried out by directly contacting a touch panel, and supplies manipulation contents thereof to the augmented reality creating portion 26. The augmented reality creating portion 26 gives the augmented reality a change in accordance with the user manipulation. The user can select the additional information superimposed on the photographed image through the user interface portion 24.

When the user interface portion 24 has received an instruction to select the additional information from the user, the additional information acquiring portion 22 stores the additional information thus selected in an additional information storing portion 30. The additional information storing portion 30, as an example, may be an Integrated Circuit (IC) chip in which an IC for carrying out recording and arithmetic operation of data is incorporated. In this case, the additional information thus selected is associated with user identifying information or photographing apparatus identifying information and is enciphered with an encryption key to thereby be safely recorded in a security area within the IC chip. Recording the additional information in the IC chip can prevent the forgery from being carried out.

When the additional information storing portion 30 does not have the security function like the IC chip, the user interface portion 24 transmits the instruction to select the additional information issued from the user to the cloud server 200 through the communication portion 32. The cloud server 200 associates the additional information thus selected with either the user identifying information or the photographing apparatus identifying information to thereby record the resulting additional information in a user database. Here, the user database is a secure database which is allowed to be accessed when either the user authentication or the apparatus authentication succeeds by using the encryption key or the like. Thus, in the user database, the additional information is safely managed every user or photographing apparatus.

When the additional information storing portion 30 is the IC chip, the IC chip is held up over an IC card reader, whereby the additional information which has been safely kept in the IC chip is safely read out to the IC card reader. Since either the user authentication or the apparatus authentication is carried out by using the encryption key when the IC card reader reads out the additional information which has been safely kept within the IC chip, the additional information is safely taken out from the IC chip. When the additional information is the coupon which can be exchanged with some item, the user can read out the coupon by using the IC card reader to thereby exchange the coupon thus read out with the item.

The display portion 28 can display the additional information stored in the additional information storing portion 30 on the display device separately from the information on the photographed image in accordance with a request made from the user interface portion 24. As a result, the user can utilize the additional information by using a method of, for example, not displaying the additional information as the augmented reality, but displaying the additional information as the coupon or the ticket on the display device of the display portion 28, bringing up the coupon or ticket to a store, or causing a reader to read the additional information.

Figure 2:
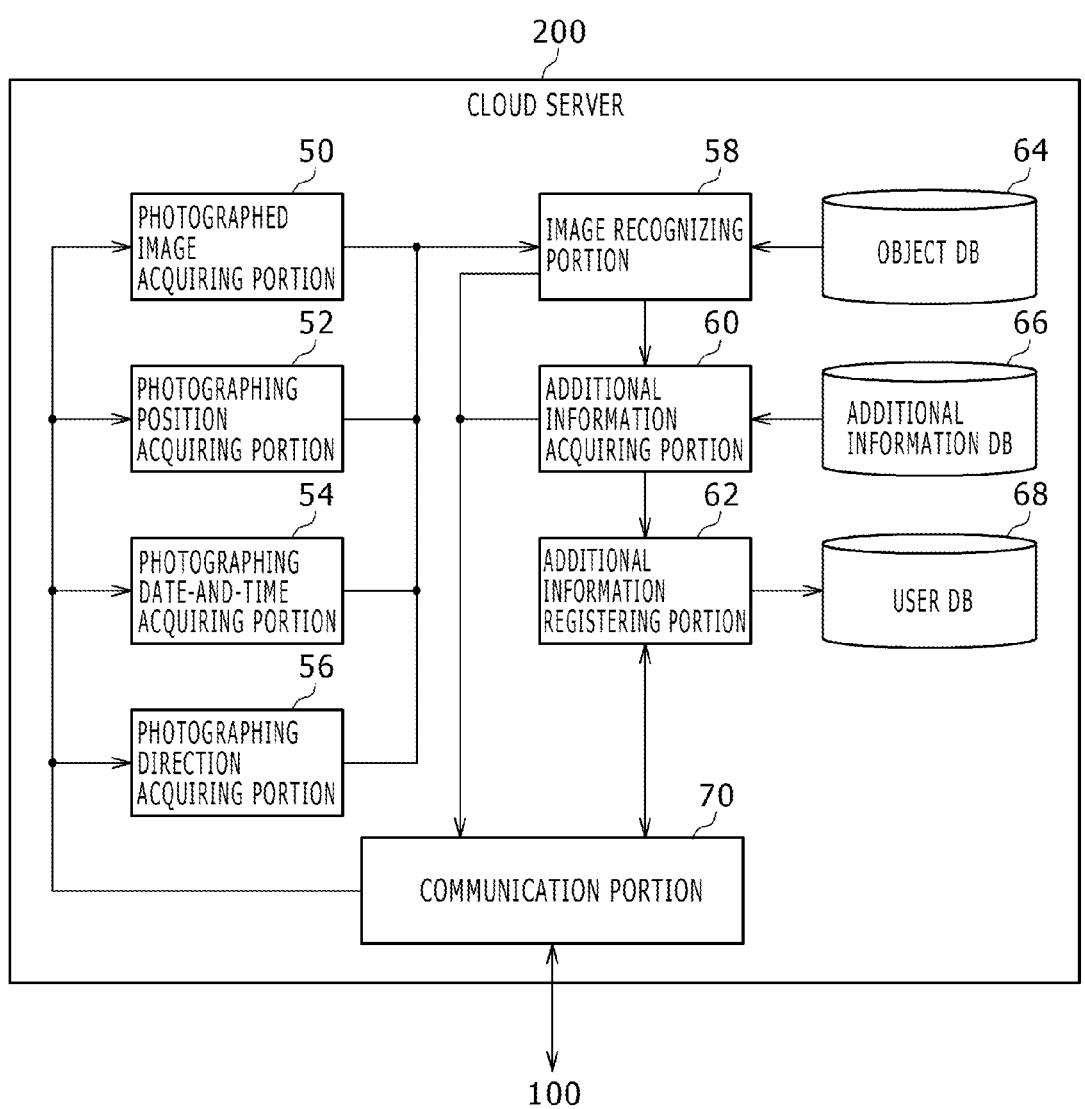
FIG. 2 is a block diagram showing a configuration of a cloud server as an additional information managing apparatus according to a second embodiment of the present disclosure.

FIG. 2 is a block diagram showing a configuration of the cloud server 200 as an additional information managing apparatus according to a second embodiment of the present disclosure. A photographed image acquiring portion 50, a photographing position acquiring portion 52, a photographing date-and-time acquiring portion 54, and a photographing direction acquiring portion 56 acquire the information on the photographed image, the information on the photographing position, the information on the date and time of the photographing, and the information on the photographing direction, respectively, from the terminal 100 through a communication portion 70 and supply these pieces of information to an image recognizing portion 58.

The image recognizing portion 58 extracts feature information of the subject in the photographed image, and takes matching of the feature information thus extracted with the feature information of the object which is registered in an object database 64 to thereby specify the object.

FIG. 3 is a diagram explaining a record 80 of the object which is stored in the object database 64. In this record 80, the feature information on the object, a thumbnail image of the object, the position information, the date-and-time information, and the direction information are made to correspond to an object ID.

The position information is latitude and longitude information on a position where the object is present. The date-and-time information is used when a specific date and specific time are specified for the object. When even the same object is desired to be distinguished depending on a season or a time zone, the objects which are different from one another in season or time zone are given with different object IDs to be handled as different objects, respectively.

The direction information is used when the line-of-sight direction in which the object is looked at is specified. When even the same object is desired to be distinguished depending on the looking direction, the objects which are different from one another in the line-of-sight direction are given with different object IDs to be handled as different objects, respectively.

The image recognizing portion 58 may combine at least one of the information on the photographing position, the information on the date and time of the photographing, and the information on the photographing direction with the feature information of the subject in the photographed image. Then, the image recognizing portion 58 may take the matching of the at least one thus combined with the record of the object which is registered in the object database 64 to thereby specify the object. For example, the image recognizing portion 58 may specify the object for which the feature information of the subject in the photographed image coincides with the information on the photographing position from the record of the object database 64. Alternatively, the image recognizing portion 58 may specify the object for which the information on the photographing position coincides with the information on the photographing direction without using the feature information of the subject in the photographed image.

In summary, although being merely an example, the condition under which the image recognizing portion 58 specifies the object includes:

(1) the coincidence between the feature information on the subject in the photographed image and the feature information on the object registered in the database;

(2) the coincidence between the feature information on the subject in the photographed image and the feature information on the object registered in the database, and the coincidence between the information on the photographing position and the information on the position of the object;

(3) the coincidence between the feature information on the subject in the photographed image and the feature information on the object registered in the database, and the coincidence between the information on the photographing position and the information on the line-of-sight direction of the object; and (4) the coincidence between the information on the photographing position and the information on the position of the object registered in the database, and the coincidence between the information on the photographing direction and the information on the line-of-sight direction of the object.

In the case of the condition (1) described above, although the condition is simple, even when a third party copies the photographed image, the third party can get the coupon. When the information on the photographing position is added to the conditions as with the case of the condition (2), if the third party is not in the photographing place, then, the coupon can be prevented from being gotten by the third party. If the condition (3) is used, when the object is photographed from the specific photographing direction, the coupon can be made to be provided. In the case of the condition (4), if the condition that the camera is pointed at the specified photographing place in the specified line-of-sight direction without using the photographed image itself is fulfilled, then, the coupon is applied. Since the photographed image itself is not conditioned, the transmission and image processing of the image data can be omitted, and the efficiency of the processing can be increased.

The image recognizing portion 58 gives an additional information acquiring portion 60 the specified object ID. The additional information acquiring portion 60 acquires the additional information ID associated with the object ID by referring to an additional information database 66. In addition, the additional information acquiring portion 60 acquires the additional information associated with the additional information ID from the additional information database 66, and gives an additional information registering portion 62 the additional information thus acquired.

FIG. 4A is a diagram explaining a record 82 of the additional information stored in the additional information database 66. Also, FIG. 4B is a diagram explaining a record 84 in which the object ID and the additional information ID are made to correspond to each other.

As shown in FIG. 4A, the image, the text, and the sound which represent the contents of the additional information are associated with the additional information ID. Also, as shown in FIG. 4B, the additional information ID is made to correspond to the object ID. For example, the ID of the additional information such as the coupon is made to correspond to the ID of the object such as the specific building or signboard.

The additional information acquiring portion 60 acquires the additional information ID made to correspond to the object ID specified by the image recognizing portion 58 by referring to the additional information database 66. The additional information acquiring portion 60 further acquires the additional information such as the image, the text, and the sound associated with the additional information ID, and gives the additional information registering portion 62 the additional information thus acquired.

The additional information acquiring portion 60 transmits the additional information thus acquired to the terminal 100 through the communication portion 70. The image recognizing portion 58, as may be necessary, transmits the thumbnail image of the object associated with the specified object ID to the terminal 100 through the communication portion 70. The terminal 100 displays the additional information acquired from the cloud server 200 on the display device of the display portion 28 with the additional information being superimposed on the photographed image. If necessary, the terminal 100 displays the thumbnail image of the specified object as well together with the additional information on the display device of the display portion 28.

In response to a request to register the additional information on the user from the communication portion 70, the additional information registering portion 62 registers the additional information ID acquired from the additional information acquiring portion 60 in a user database 68 with the additional information ID thus acquired being associated with either the user ID or the apparatus ID.

FIG. 5 is a diagram explaining a record 86 in which the user ID/apparatus ID stored in the user database 68, and the additional information ID are made to correspond to each other. The record 86 is used to manage the acquired additional information ID every either user or apparatus. The record is registered in the user database 68 in such a manner to thereby disenable the same additional information to be acquired twice by the same user or in the same apparatus.

Figure 6:
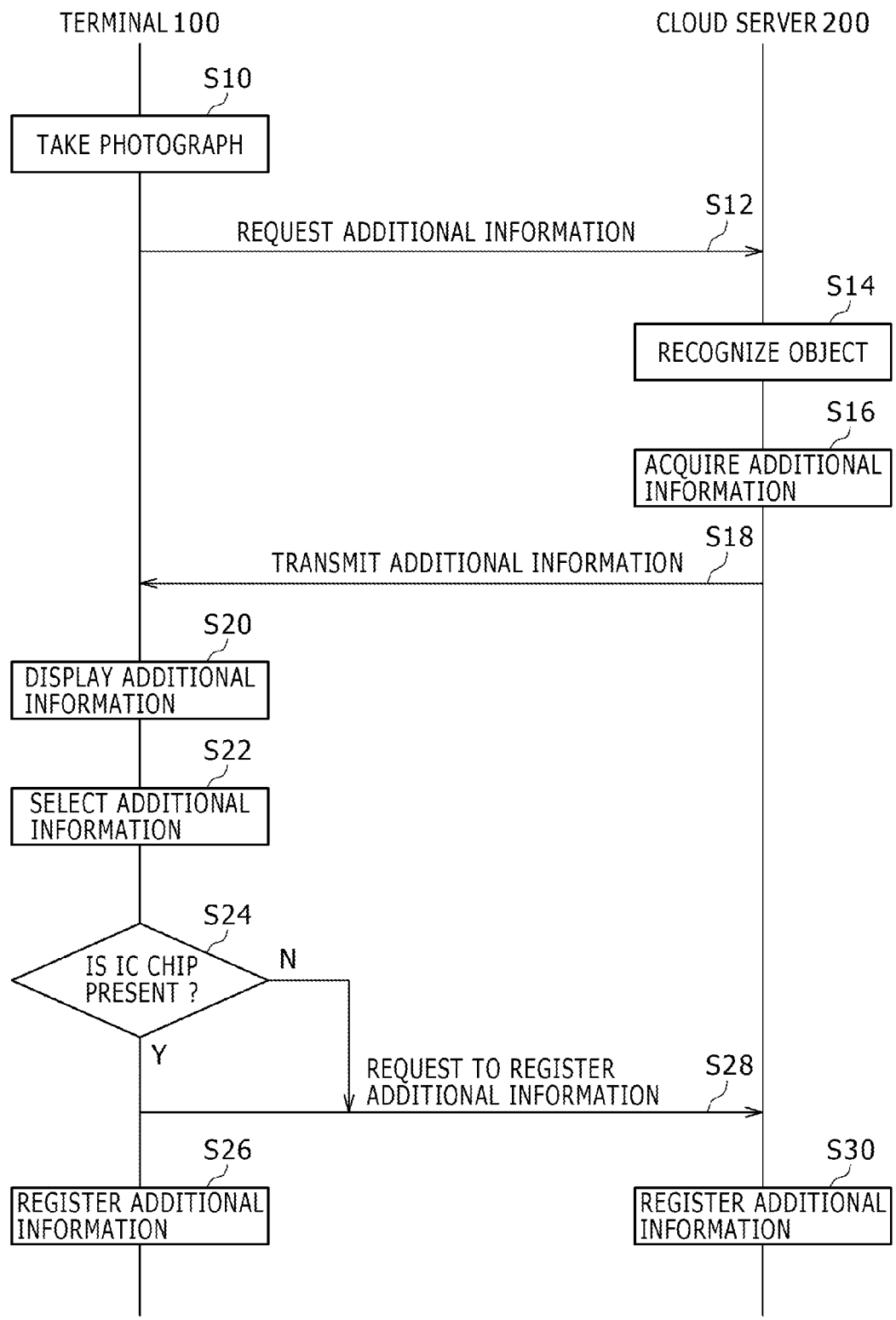
FIG. 6 is a sequence diagram explaining a flow of provision and registration of the additional information by the terminal shown in FIG. 1, and the cloud server shown in FIG. 2.

FIG. 6 is a sequence diagram explaining the provision of the additional information, and the flow of the registration by the terminal 100 of the first embodiment, and the cloud server 200 of the second embodiment.

In the terminal 100, the photographing portion 10 photographs the reality space (S10). The additional information requesting portion 18 transmits the additional information request together with the information on the photographed image to the cloud server 200 (S12).

In the cloud server 200, the image recognizing portion 58 specifies the object from the photographed image based on the image recognition (S14). The additional information acquiring portion 60 acquires the additional information associated with the object the image of which is recognized (S16). The additional information acquiring portion 60 transmits the additional information thus acquired to the terminal 100 (S18).

In the terminal 100, the additional information acquiring portion 22 receives the additional information from the cloud server 200. Also, the augmented reality creating portion 26 subjects the fact that the additional information is present in the object of the photographed image to the augmented reality, and displays the resulting information on the display device of the display portion 28 (S20). The user interface portion 24 receives the instruction to select the additional information which is displayed in the photographed image from the user (S22).

When the function of the IC chip is mounted to the terminal 100 (Y in S24), the additional information selected by the user interface portion 24 is registered in a security area of the IC chip (S26).

When no function of the IC chip is mounted to the terminal 100 (N in S24), the user interface portion 24 transmits the request to register the additional information selected by the user interface portion 24 to the cloud server 200 (S28). In the cloud server 200, the additional information registering portion 62 registers the additional information selected by the user in the user database 68 with the additional information being associated with either the user ID or the apparatus ID (S30).

FIGS. 7A to 7D are respectively views explaining examples in each of which the additional information is displayed as the augmented reality in the object in the photographed image.

A description will now be given by giving a tablet terminal 500 as an example of the terminal 100. FIG. 7A is a view explaining a photographed image which is displayed on a touch panel 510 of the tablet terminal 500. The image captured with the built-in camera of the tablet terminal 500 is displayed on the touch panel 510. Thus, the user manipulates a manipulation button 520 or directly touches the touch panel 510 to thereby enable he/she to interact with the augmented reality which is being displayed on the touch panel 510.

In this case, the user carries out the photographing by pointing the built-in camera of the tablet terminal 500 at a building having a signboard of "ABC beer" mounted thereto. The information on the photographed image is transmitted to the cloud server 200 by using the communication function of the tablet terminal 500.

The cloud server 200 recognizes the image of the object from the image which has been captured with the tablet terminal 500. In this case, the information on the signboard 552 of the ABC beer is registered in the object database 64. Thus, the image recognizing portion 58 extracts the signboard 552 as the object from the photographed image. The cloud server 200 transmits the information which specifies the image area of the extracted object to the tablet terminal 500.

FIG. 7B is a view explaining the object which is specified within the photographed image. The tablet terminal 500 carries out highlighting for, for example, surrounding the surround of the signboard 552 by a frame 550 indicated by a dotted line by using the information which specifies the image area of the extracted object. Thus, the tablet terminal 500 informs the user of that the signboard 552 is extracted as the object.

In the cloud server 200, the additional information acquiring portion 60 acquires the additional information associated with the extracted object from the additional information database 66, and transmits the additional information thus acquired to the tablet terminal 500.

FIG. 7C is a view explaining the additional information which is superimposed on the object within the photographed image. In the tablet terminal 500, the augmented reality creating portion 26 creates an image showing a situation 554 that a page is turned so as for the user to understand that the additional information is provided on the signboard 552 as the augmented reality.

Figure 7D:
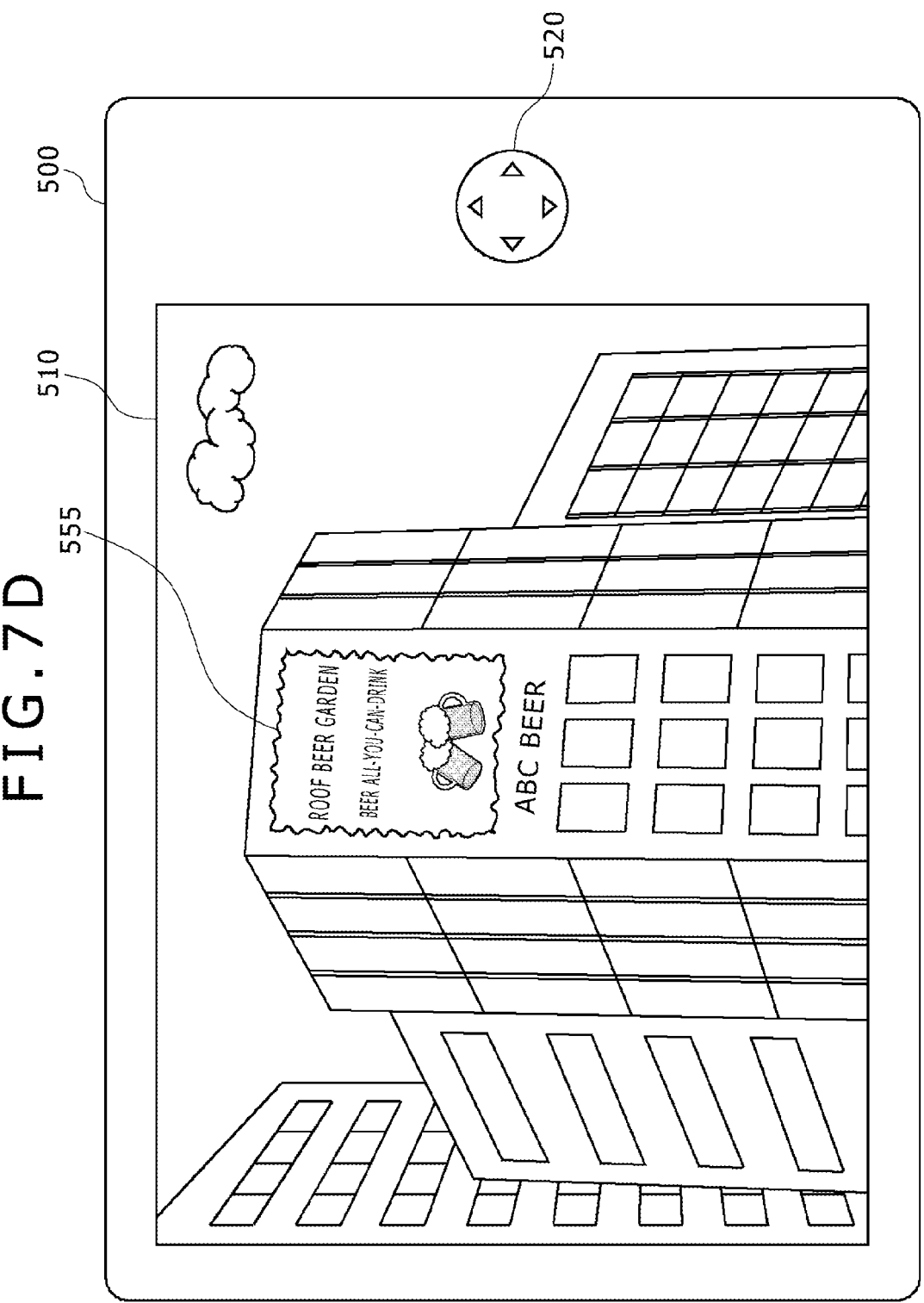
FIG. 7D is a view explaining an example in which a coupon is displayed as the additional information in a position of the object within the photographed image.

FIG. 7D is a view explaining an example in which the coupon is displayed as the additional information in the position of the object within the photographed image. When the user interface portion 24 has received an operation for tapping on the signboard 552 from the user, the page is turned, and thus a coupon 555 is displayed as the additional information in the position of the signboard 552. In this case, the coupon 555 is displayed which can be exchanged with a service with which the beer is all you can drink in a beer garden on a roof of this building. By selecting the coupon 555, the user can preserve the information on the coupon 555 in the security area of the IC chip built in the tablet terminal 500, or can transmit the information on the coupon 555 to the cloud server 200 to thereby register therein the information on the coupon 555 with the information on the coupon 555 being associated with either the user ID or the apparatus ID.

FIGS. 8A to 8D are respectively views explaining different examples in each of which the additional information is displayed as the augmented reality in the object in the photographed image.

As shown in FIG. 8A, a photographed image of a scene containing therein an image of the Tokyo Tower 532 is displayed on the touch panel 510 of the tablet terminal 500. The image recognizing portion 58 of the cloud server 200 extracts the image of the Tokyo Tower 532 as the object based on the feature information from the photographed image. Also, a frame 530 representing that the image of the Tokyo Tower 532 is extracted as the object is displayed on the touch panel 510.

The additional information acquiring portion 60 of the cloud server 200 acquires the additional information (the coupon in this case) associated with the extracted object. As shown in FIG. 8B, in the touch panel 510 of the tablet terminal 500, an icon 534 representing that there is the coupon in the extracted object is displayed as the augmented reality on the image of the Tokyo Tower 532 so as to be superimposed thereon.

When the user interface portion 24 has received an instruction to select the icon 534 from the user, as shown in FIG. 8C, a coupon 540 is displayed within the photographed image. The coupon 540 is a premium ticket with which a hotel accommodation plan with the Tokyo Tower observatory ticket is provided in 20% OFF. When the user has selected the coupon 540, the information on the coupon 540 is stored in the security area within the IC chip.

In the cloud server 200, when the image recognizing portion 58 takes the matching between the object the information on which is registered in the object database 64, and the subject of the photographed image based on the feature information, a plurality of objects are found as candidates in some cases. For example, when the Eiffel Tower having the feature similar to that of the Tokyo Tower is found as the candidate of the object, the image recognizing portion 58 gives the additional information acquiring portion 60 both of the image of the Tokyo Tower and the image of the Eiffel Tower as the candidates of the object. The additional information acquiring portion 60 acquires the additional information associated with the image of the Tokyo Tower and the additional information associated with the image of the Eiffel Tower from the additional information database 66, and transmits both of the two pieces of additional information to the tablet terminal 500. In addition, when the plurality of candidates are present as the objects, the image recognizing portion 58 acquires thumbnail images of the candidates of the objects from the object database 64, and transmits these pieces of information on the thumbnail images thus acquired to the tablet terminal 500.

As shown in FIG. 8D, the coupon 540 associated with the image of the Tokyo Tower, and a coupon 542 associated with the Eiffel Tower are both displayed on the touch panel 510 of the tablet terminal 500. The contents of the coupon 542 associated with the image of the Eiffel Tower are a valuable coupon with which shopping in Paris can be enjoyed in 10% OFF.

At this time, the thumbnail images of the objects are displayed in the coupons, respectively. The contents of the coupon are displayed together with a thumbnail image 541 of the Tokyo Tower are displayed in the coupon 540 associated with the image of the Tokyo Tower. Also, the contents of the coupon are displayed together with a thumbnail image 543 of the Eiffel Tower are displayed in the coupon 542 associated with the image of the Eiffel Tower.

The user can judge whether or not the objects are properly determined by looking at the thumbnail images displayed in the coupons, respectively. In this example, it is understood that although the coupon in which the thumbnail image of the Tokyo Tower is displayed is proper, the coupon in which the thumbnail image of the Eiffel Tower is displayed is misjudged.

When there is a plurality of candidates of the objects in such a manner, with only the image recognition, the Tokyo Tower is misrecognized as the Eiffel Tower, and thus the shopping coupon of Paris which is unnecessary for the user is provided for the user. In order to cope with such a situation, the photographing position acquiring portion 52 of the cloud server 200 may acquire the information on the photographing position from the tablet terminal 500, and the image recognizing portion 58 may narrow down the candidates of the object based on the photographing position. In this example, since the photographing position is Tokyo and is at a long distance from Paris, the Eiffel Tower can be weeded out from the candidates of the object.

In addition, when a plurality of candidates are present for the object, a constitution can be adopted such that the probability which is determined based on the image matching or the position information is displayed as a numerical value in the coupon; the coupons are sorted in the order of decreasing the probability; or the coupon having the small probability is displayed small, whereby the user can easily select the proper coupon based on the probability.

As another example, the different coupons may be brought up based on the date and time of the photographing. For example, the coupons which are different from one another depending on the time zone may be brought up for the same object in such a way that the coupon of the bus sightseeing of Tokyo is brought up, for the Tokyo Tower which was photographed in the early morning, and the coupon of the dinner is brought up for the Tokyo Tower which was photographed in the evening. Alternatively, by using the information on the day of the photographing, the coupon of introducing the place famous for cherry blossoms in the suburbs of Tokyo may be brought up for the Tokyo Tower which was photographed in the spring. Also, the coupon of introducing the place famous for beautiful autumn leaves in the suburbs of Tokyo may be brought up for the Tokyo Tower which was photographed in the autumn.

As still another example, when the construction such as the tower, the bridge or the building is lighted up in the night, even for the same construction, the coupons which are different from one another depending on the color or pattern of the lighting-up may also be brought up. For example, the kind or presentation source of the coupon may also be made to differ depending on the illumination in such a way that when the bridge which is lighted up blue is photographed by a company, the coupon which is provided by a certain company is provided, but when the bridge which is lighted up in rainbow color is photographed by the same company, the coupon which is provided by another company is provided.

The present disclosure has been described so far based on the embodiments. Note that, it is understood by those skilled in the art that the embodiments are merely the exemplifications, various modified changes can be made in combination of the constituent elements thereof or processing processes, and these modified changes also fall within the scope of the present disclosure.

Although in the above description, the examples in each of which the outside world is photographed with the mobile apparatus, the subject which shall be photographed may also be the television picture or the game picture. For example, it may also be adopted that when a specific scene or a commercial message of a television program is photographed with the terminal 100, and information on an image thereof is transmitted to the cloud server 200, a coupon is provided as the additional information from the cloud server 200 to the terminal 100. In addition, it may also be adopted that when a picture of a specific stage or a specific character in a game is photographed with the terminal 100, and information on an image thereof is transmitted to the cloud server 200, a digital item which can be utilized in the game is provided as the additional information from the cloud server 200 to the terminal 100.

The present disclosure contains subject matter related to that disclosed in Japanese Priority Patent Application JP 2013-229699 filed in the Japan Patent Office on Nov. 5, 2013, the entire content of which is hereby incorporated by reference.

What is claimed is:

1. A terminal apparatus, comprising:
    a photographing portion configured to photograph a subject which is present in a reality space and produce a photographed image thereof;
    an additional information acquiring portion configured to acquire additional information which is made to correspond to an object recognized within said photographed image,
        wherein said object is recognized in a cloud server in communication with said terminal, and specified by combining information on photographing position with information on photographing direction without using the photographed image; and
    an additional information storing portion configured to store therein the acquired additional information in relation to either user identification information or photographing apparatus identification information.

2. The terminal apparatus according to claim 1, wherein said additional information storing portion is an integrated circuit chip, and the acquired additional information is stored in a security area of said integrated circuit chip.

3. The terminal apparatus according to claim 1, further comprising an augmented reality creating portion configured to create the acquired additional information as augmented reality within the photographed image.

4. The terminal apparatus according to claim 1, wherein the additional information is information on a coupon which is exchangeable with a predetermined item.

5. The terminal apparatus of claim 1, wherein the additional information is superimposed on the photographed image and a user can select the additional information though a user interface.

6. The terminal apparatus of claim 5, wherein selecting the additional information causes the additional information to be: (1) associated with user identifying information and photographing apparatus identifying information; and (2) stored in said additional information storing portion.

7. The terminal apparatus of claim 6, wherein the additional information storing portion is an Integrated Circuit (IC) chip.

8. The terminal apparatus of claim 7, wherein said additional information is read out when said IC chip is held up over an IC card reader.

9. The terminal apparatus of claim 1, wherein said terminal further comprises a display portion that displays the additional information stored in the additional information storing portion separately from the photographed image in response to a user request.

10. The terminal apparatus of claim 1, wherein multiple photographs of the same object can be distinguished based on at least one of a season, a time zone, and the photographing direction.

11. An additional information managing apparatus, comprising:
    a photographed image acquiring portion configured to acquire a photographed image obtained by photographing a subject which is present in a reality space;
    an image recognizing portion configured to recognize the object within the photographed image, and specify the object by combining information on photographing position with information on photographing direction without using the photographed image;
    an additional information acquiring portion configured to acquire additional information which is associated with the object recognized by referring to a table in which the object and the additional information are associated with each other; and a transmitting portion configured to transmit the additional information thus acquired to a terminal apparatus with which the photographed image has been photographed.

12. The additional information managing apparatus according to claim 11, further comprising an additional information registering portion configured to register therein the acquired additional information in relation to either user identification information or photographing apparatus identification information.

13. The additional information managing apparatus according to claim 11, further comprising:

a photographing position acquiring portion configured to acquire information on the photographing position.

14. The additional information managing apparatus according to claim 11, further comprising:

a photographing date-and-time acquiring portion configured to acquire information on a date and time of photographing, wherein said image recognizing portion specifies an object based on the acquired information on the date and time of the photographing.

15. The additional information managing apparatus according to claim 11, further comprising:

a photographing direction acquiring portion configured to acquire information on the photographing direction.

16. An additional information managing method, comprising:

acquiring a photographed image obtained by photographing an object which is present in a reality space;

recognizing the object within the photographed image, and specifying the object by combining information on photographing position with information on photographing direction without using the photographed image;

acquiring additional information which is associated with the object thus image-recognized by referring to a table in which the object and the additional information are associated with each other; and transmitting the additional information thus acquired to a terminal apparatus with which the photographed image has been photographed.

17. A non-transitory, computer readable storage medium containing a program comprising instructions for:

acquiring a photographed image obtained by photographing an object which is present in a reality space;

recognizing the object within the photographed image, and specifying the object by combining information on photographing position with information on photographing direction without using the photographed image;

acquiring additional information which is associated with the object recognized by referring to a table in which the object and the additional information are associated with each other; and transmitting the additional information thus acquired to a terminal apparatus with which the photographed image has been photographed.

* * * * *